United States Patent
Zhang et al.

(10) Patent No.: US 11,417,173 B2
(45) Date of Patent: Aug. 16, 2022

(54) IMAGE PROCESSING METHOD, APPARATUS, AND NON-TRANSITORY COMPUTER READABLE STORAGE MEDIUM

(71) Applicant: SENSETIME INTERNATIONAL PTE. LTD., Singapore (SG)

(72) Inventors: Yao Zhang, Singapore (SG); Wenbin Zhang, Singapore (SG); Shuai Zhang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/139,390

(22) Filed: Dec. 31, 2020

(65) Prior Publication Data

US 2022/0036693 A1    Feb. 3, 2022

Related U.S. Application Data

(63) Continuation of application No. PCT/IB2020/060202, filed on Oct. 30, 2020.

(30) Foreign Application Priority Data

Aug. 1, 2020 (SG) ............... 10202007349R

(51) Int. Cl.
*G07F 17/32* (2006.01)
*G06T 7/73* (2017.01)
(Continued)

(52) U.S. Cl.
CPC ...... *G07F 17/3241* (2013.01); *A63F 3/00643* (2013.01); *G06T 7/73* (2017.01); *G06V 10/44* (2022.01); *G06V 20/40* (2022.01); *G07F 17/322* (2013.01); *G07F 17/3206* (2013.01); *G07F 17/3209* (2013.01); *G07F 17/3225* (2013.01); *G07F 17/3232* (2013.01); *G07F 17/3234* (2013.01); *G07F 17/3293* (2013.01)

(58) Field of Classification Search
None
See application file for complete search history.

(56) References Cited

U.S. PATENT DOCUMENTS

| 2005/0272501 A1 | 12/2005 | Tran et al. |
| 2012/0040727 A1 | 2/2012 | Gururajan et al. |

(Continued)

FOREIGN PATENT DOCUMENTS

| WO | WO 2016/058085 A1 | 4/2016 |
| WO | WO 2017/197452 A1 | 11/2017 |
| WO | WO 2018/227294 A1 | 12/2018 |

OTHER PUBLICATIONS

Cai et al.; "MessyTable: Instance Association in Multiple Camera Views"; European Conf. on Computer Vision; 2020; 27 pages.

*Primary Examiner* — Jason T Yen
(74) *Attorney, Agent, or Firm* — BakerHostetler

(57) ABSTRACT

The present disclosure relates to an image processing method and apparatus, an electronic device, and a storage medium. The method includes: obtaining video streams of a game tabletop; detecting target objects in a plurality of image frames included in the video streams; determining a current game stage based on the target objects; and determining game detecting results according to the target objects and the determined game stage.

19 Claims, 6 Drawing Sheets

(51) Int. Cl.
*A63F 3/00* (2006.01)
*G06V 10/44* (2022.01)
*G06V 20/40* (2022.01)

(56) References Cited

U.S. PATENT DOCUMENTS

| | | | |
|---|---|---|---|
| 2013/0101219 A1* | 4/2013 | Bosworth | H04N 21/44008 |
| | | | 382/195 |
| 2017/0330414 A1* | 11/2017 | Dallmeier | G07F 17/3209 |
| 2018/0061178 A1* | 3/2018 | Shigeta | G07F 17/3209 |
| 2018/0114068 A1 | 4/2018 | Balasundaram et al. | |
| 2018/0268648 A1* | 9/2018 | Shigeta | G07F 17/3232 |
| 2019/0347893 A1 | 11/2019 | Shigeta | |
| 2020/0034629 A1 | 1/2020 | Vo et al. | |

\* cited by examiner

IMAGE PROCESSING METHOD, APPARATUS, AND NON-TRANSITORY COMPUTER READABLE STORAGE MEDIUM

The present application is a continuation of and claims priority under 35 U.S.C. 120 to PCT Application No. PCT/IB2020/060202, filed on Oct. 30, 2020, which claims priority to Singapore Patent Application No. 10202007349R, filed with the Intellectual property office of Singapore on Aug. 1, 2020 and entitled "Image Processing Method and Apparatus, Electronic Device, and Storage Medium". All the above-referenced priority documents are incorporated herein by reference.

TECHNICAL FIELD

The present disclosure relates to the field of computer vision technologies, and in particular, to an image processing method, an apparatus, and a non-transitory computer readable storage medium.

BACKGROUND

With the improvement of people's living standards, table games are more and more popular among users. Table games involve a very old industry. Compared with popular online desktop games now, face-to-face table games in real scenes are more attractive. Face-to-face table games, including chess, Go, and the like, pay more attention to the exercise of multiple ways of thinking. They do not rely on electronic devices. Some enthusiasts will also shoot the game process to repeatedly watch and learn skills.

SUMMARY

The present disclosure provides technical solutions for image processing.

An image processing method provided according to a first aspect of the present disclosure includes: obtaining video streams of a game tabletop; detecting target objects in a plurality of image frames included in the video streams; determining a current game stage based on the target objects; and determining game detecting results according to the target objects and the determined game stage.

An image processing apparatus provided according to a second aspect of the present disclosure includes: an obtaining module, configured to obtain video streams of a game tabletop; a detecting module, configured to detect target objects in a plurality of image frames included in the video streams; a game stage determining module, configured to determine a current game stage based on the target objects; and a result determining module, configured to determine game detecting results according to the target objects and the determined game stage.

An electronic device provided according to a third aspect of the present disclosure includes: a processor; and a memory configured to store processor-executable instructions, where the processor is configured to invoke the instructions stored in the memory, to perform the method according to any of the foregoing in the first aspect.

A computer-readable storage medium provided according to a fourth aspect of the present disclosure has computer program instructions stored thereon, where when the computer program instructions are executed by a processor, the method according to any of the foregoing in the first aspect is implemented.

A computer program provided according to a fifth aspect of the present disclosure comprises computer-readable codes which, when run in the electronic device, a processor in the electronic device is caused to execute the method according to any of the foregoing in the first aspect.

In the embodiments of the present disclosure, video streams about a game tabletop are obtained, target objects in images in the video streams are detected by performing target detection processing on in the video streams, the current game stage of the game is determined based on the detected target objects, and detecting of the game tabletop is further performed by means of the detected target objects and the determined game stage. It is convenient, quick and accurate. Moreover, detecting of the game process may be automatically performed, thereby facilitating implementation of large-scale and industrial operation, improving operation efficiency and reducing errors in the operation process.

It should be understood that the above general description and the following detailed description are merely exemplary and explanatory, and are not intended to limit the present disclosure.

The other features and aspects of the present disclosure can be described more clearly according to the detailed descriptions of the exemplary embodiments in the accompanying drawings.

BRIEF DESCRIPTION OF THE DRAWINGS

The accompanying drawings herein incorporated in the description and constituting a part of the description describe the embodiments of the present disclosure and are intended to explain the technical solutions of the present disclosure together with the description.

DETAILED DESCRIPTION

Figure 1:
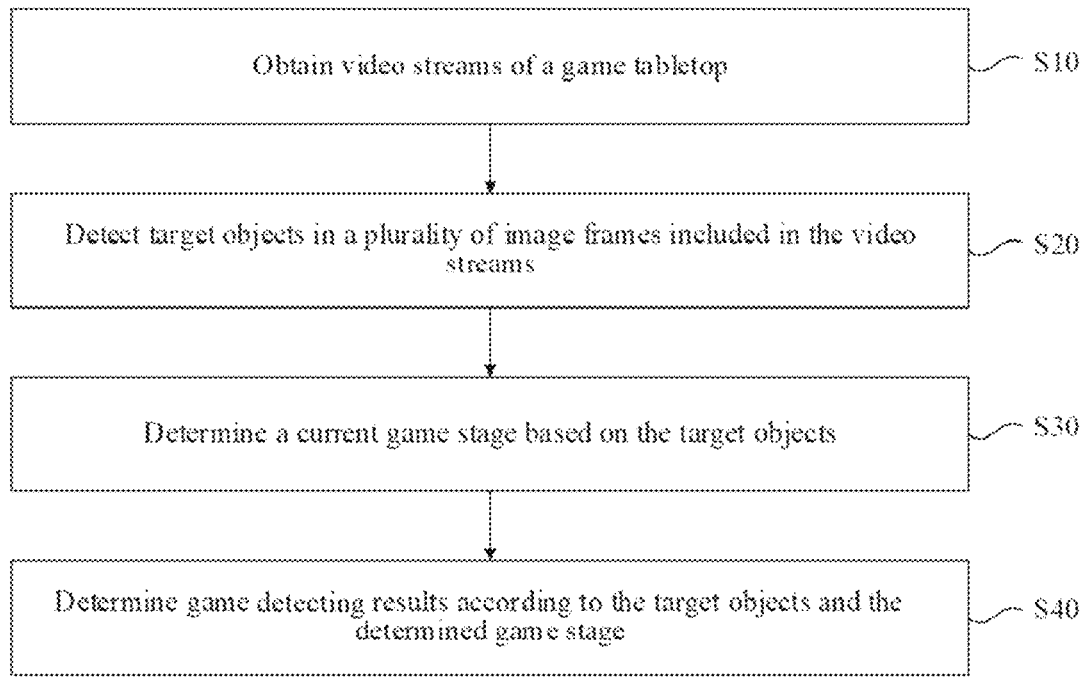
FIG. 1 shows a flowchart of an image processing method according to embodiments of the present disclosure.

Various exemplary embodiments, features, and aspects of the present disclosure are described below in detail with reference to the accompanying drawings. The same reference numerals in the accompanying drawings represent elements having same or similar functions. Although the various aspects of the embodiments are illustrated in the accompanying drawings, unless stated particularly, it is not required to draw the accompanying drawings in proportion.

The special term "exemplary" herein means "used as examples, embodiments, or descriptions". Any embodiment herein described by the term "exemplary" is not necessarily construed as being superior to or better than other embodiments.

The term "and/or" herein is merely an association relationship describing associated objects, indicating that there may be three relationships, for example, A and/or B, which may indicate that A exists separately, both A and B exist, and B exists separately. In addition, the term "at least one" herein means any one of multiple elements or any combination of at least two of the multiple elements, for example, including at least one of A, B, or C, which may indicate that any one or more elements selected from a set consisting of A, B, and C are included.

In addition, numerous details are given in the following detailed description for the purpose of better explaining the present disclosure. A person skilled in the art should understand that the present disclosure may still be implemented even without some of those details. In some examples, methods, means, elements, and circuits that are well known to a person skilled in the art are not described in detail so that the principle of the present disclosure becomes apparent.

An execution subject of the image processing method provided by the embodiments of the present disclosure may be an image processing apparatus, for example, the image processing method may be executed by a terminal device or a server or other processing devices. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, etc. The server may include local server and/or a cloud server. In some possible implementations, the image processing method may be implemented by a processor by invoking computer-readable instructions stored in a memory. The present disclosure can be applied to scenes such as video and image detection and recognition. For example, it can be used to recognize and detect different stages of a video stream. The present disclosure does not limit specific application scenarios.

FIG. 1 shows a flowchart of an image processing method according to embodiments of the present disclosure. According to FIG. 1, the image processing method includes the following steps.

At S10, video streams of a game tabletop are obtained.

In some possible implementations, at least one image acquisition device (for example, a camera or a camera lens) may be provided around the game tabletop to acquire video streams of the game tabletop. In the embodiments of the present disclosure, video streams acquired by an image acquisition device in real time may be directly received, or the acquired video streams may be received by communication with other electronic devices connected to the image acquisition device. No specific limitation is made thereto in the present disclosure. When video streams are obtained, image frames in the video streams may be obtained.

In order to more comprehensively acquire images (video streams) at a plurality of angles of the game tabletop and improve the detecting accuracy, at least two image acquisition devices in different views may be used to acquire images of the game tabletop in the embodiments of the present disclosure. The at least two views may include a bird view (a first view) and a side view (a second view), that is, image acquisition devices in at least the side view and the bird view may be used to acquire images (video streams) of the game tabletop. The image acquisition device in a bird view may be above the central region of the game tabletop. Side views may be located on both sides of the game tabletop, that is, on both sides of the image acquisition device in a bird view, and may include, for example, a left view and a right view. Two image acquisition devices in a side view may be oppositely provided to comprehensively acquire images of the game tabletop. Comprehensive information in the game tabletop may be obtained by means of images acquired by the image acquisition devices in at least two views. In the following embodiments, an image corresponding to a video stream acquired in the first view is called a first image, and an image corresponding to a video stream acquired in the second view is called a second image, so as to distinguish images in different views. In other embodiments, if more other views are included, it may be further called a third image, a fourth image, etc. for distinguishing. No specific limitation is made thereto in the present disclosure.

That is to say, in the embodiments, a first image may be acquired by a first image acquisition device, and a second image may be acquired by a second image acquisition device. In some embodiments, the first image acquisition device and the second image acquisition device may perform image acquisition on a same scene, but at different positions, so as to obtain a first image and a second image, respectively. Correspondingly, the first image and the second image may be images of the same scene but corresponding to different views. Exemplarily, the first image and the second image may include a same object, but the position of the target object in the first image may be different from the position thereof in the second image. For example, the first image and the second image include a same background and three apples, but the positions of the three apples in the first image are different from the positions thereof in the second image.

At S20, target objects in a plurality of image frames included in the video streams are detected.

In some possible embodiments, during a game, the first image and the second image may include a same target object or at least some different target objects, and the position of the target object in the first image is different from the position thereof in the second image. For example, the game tabletop may include at least one item object, for example, a game currency, a card, or game currency. When images of the game tabletop are acquired, the images may include the item object above, and may also include a person object around the tabletop. The person object may include an operator (such as a croupier) and game players. Based on this, in the embodiments of the present disclosure, desired target objects may be detected from the obtained images, and the target objects may include a person object and an item object. The item object may include at least one of a game currency (an exchange item) and a game card, and the person object may include at least one of a body, a face, and a hand.

In some possible implementations, target detection processing of the same types of target objects may be performed on at least one acquired image, i.e., detecting all types of target objects in all images, to obtain position information of all types of target objects in each image. For example, in the embodiments of the present disclosure, a body, a face, a hand, a game currency (an exchange item), a game card, etc. in the obtained image may be detected to obtain detection results of target objects in the image, where the detection result may include a label of a target object, whether there is a corresponding target object, the position of the detected target object, and the confidence score of the detected target object.

In some other possible implementations, target detection processing of different types of target objects may also be performed on images in different views. For example, for an image acquired in a side view, the type of target object to be detected may include a person object and an item object, and for an image acquired in a bird view, the type of target object to be detected may include an item object such as a game currency and a game card. In this way, detection results of corresponding target objects in different images may be obtained respectively. Based on this, a waste of resources may be reduced on the one hand, and operation efficiency may be improved on the other hand.

In some possible implementations, according to the embodiments of the present disclosure, the detection process of the target objects may be implemented by a target detection neural network, which may be trained to detect target objects in input images. The target detection neural network in the embodiment of the present disclosure may be a convolutional neural network, and may include, for example, a Region Proposal Network (RPN) or a faster regional convolutional neural network, which is not a specific limitation to the present disclosure.

In the embodiments of the present disclosure, when target objects in images in different views are obtained, appearance information and surrounding information of the target objects in the images in different views may also be used to determine association relationships between the target objects in different views. Association relationships between the target objects in the first image and the target objects in the second image may be determined based on appearance information and surrounding information of the target objects in the first image obtained in the first view and appearance information and surrounding information of the target objects in the second image obtained in the second view, where the appearance information of a target object is determined according to pixels within a bounding box of the target object in an image in which the target object is located, and the surrounding information of a target object is determined according to pixels within a set range around a bounding box of the target object in an image in which the target object is located.

At S30, a current game stage is determined based on the target objects.

In some possible implementations, according to the detection results of the target objects in the images, the current game stage of the game may be determined. For example, in the embodiments of the present disclosure, a specific target object is detected in a specific region of the game tabletop, and a time point corresponding to a first image frame in a plurality of continuous image frames in which the specific target object is detected in the specific region of the game tabletop is determined; and the determined time point is taken as a start time point of a game stage. In the embodiments of the present disclosure, the entire game process may be divided into a first game stage, a second game stage, and a third game stage according to the detection results. The first game stage is a stage where game players place game currencies in game participation regions of the game tabletop, and is used to indicate the values of game currencies of the game players involved in the current round of game, the second game stage is a stage where a croupier gives out game cards (a card give-out stage), and the third game stage relates to a process of calculating game results of the game players and performing payment (a payment stage). For different games, different game stages may be included. No specific limitation is made thereto in the present disclosure.

In some possible implementations, whether it is in the first game stage may be determined according to detected position changes of game currencies and detected position changes of hands in images in adjacent time frames within a preset time, whether it is in the second game stage may be determined according to a position change of a game card in the images, and whether it is in the third game stage may be determined according to the number of game cards and the sum of points thereof.

At S40, game detecting results are determined according to the target objects and the determined game stage.

In some possible implementations, for one or more game stages, target objects in images corresponding to the corresponding game stage may be detected, so that whether there is a violation at the stages may be determined, statistics about game results of the game players may be collected, and verification may be performed on the croupier's payment operations, etc., thereby achieving comprehensive detecting of the game process.

In the embodiments of the present disclosure, video streams formed by images about a game tabletop are obtained, target objects in the images are detected by performing target detection processing on the images in the video streams, the current game stage of the game is determined based on the detected target objects, and detecting of the game tabletop is performed by means of the detected target objects and the determined game stage. It is convenient, quick and accurate. Moreover, detecting of the game process may be automatically performed, thereby facilitating implementation of large-scale and industrial operation.

Figure 2:
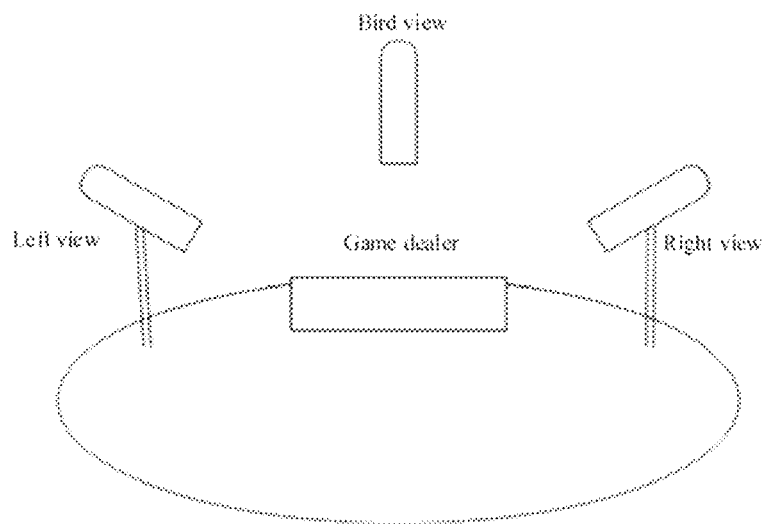
FIG. 2 shows a schematic diagram of an application scenario of an image processing method according to embodiments of the present disclosure.

The following describes the embodiments of the present disclosure in detail with reference to the accompanying drawings. FIG. 2 shows a schematic diagram of an application scenario of an image processing method according to embodiments of the present disclosure. An image acquisition device in at least one view may be provided above the game tabletop for acquiring images of the game tabletop. As shown in FIG. 2, in the embodiments of the present disclosure, three image acquisition devices in a left view, a right view, and a bird view are provided above the game tabletop, and are respectively used to acquire images of the game tabletop in the corresponding views, so as to comprehensively acquire image information of the game tabletop. When images acquired in the views are obtained, target detection processing may be further performed on the obtained images to detect target objects in the images.

Figure 3:
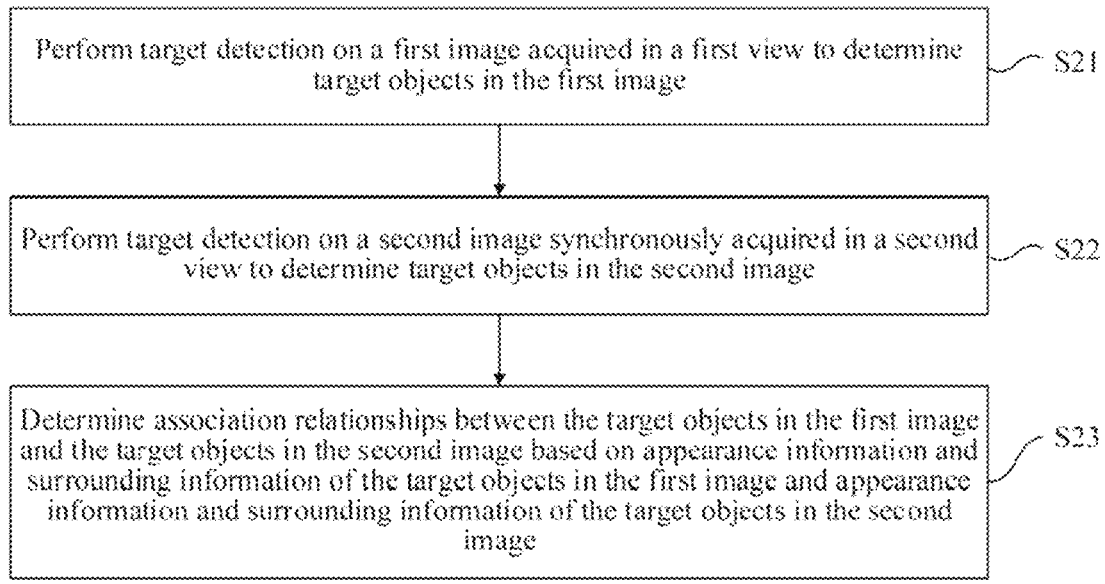
FIG. 3 shows a flowchart of step S20 in an image processing method according to embodiments of the present disclosure.

FIG. 3 shows a flowchart of step S20 in an image processing method according to embodiments of the present disclosure. Detecting target objects in a plurality of image frames included in the video streams includes the following steps.

At S21, target detection is performed on a first image acquired in a first view to determine target objects in the first image.

At S22, target detection is performed on a second image synchronously acquired in a second view to determine target objects in the second image.

At S23, association relationships between the target objects in the first image and the target objects in the second image are determined based on appearance information and surrounding information of the target objects in the first image and appearance information and surrounding information of the target objects in the second image, where the appearance information of a target object is determined according to pixels within a bounding box of the target object in an image in which the target object is located, and the surrounding information of a target object is determined according to pixels within a set range around a bounding box of the target object in an image in which the target object is located.

As described in the above embodiments, in the embodiments of the present disclosure, the same target detection processing may be performed on the images in a plurality of views to detect all types of target objects in the image to obtain detection results of one or more target objects in each image. Or, target detection processing of target objects corresponding to different views may be performed on the images in the different views, to obtain detection results of target objects corresponding to the image views in the images. For example, in the embodiments of the present disclosure, target detection processing may be performed on the first image acquired in the first view of the game tabletop to detect a first target object in the first image, where the first target object includes a person object and an item object. For example, the person object may include a hand, a face and a body, and the item object may include a game currency and game currency. In addition, target detection processing may also be performed on the second image acquired in the second view of the game tabletop to detect a second target object in the second image, where the second target object includes an item object, and the item object may include a game currency and an exchange item.

In some possible implementations, at least one target detection neural network may be used to perform the above target detection processing. For example, one target detection neural network may be used to detect all types of target objects in the images, or a plurality of target detection neural networks may be configured and one target detection neural network may perform target detection processing of at least one type of target object. For example, a first target detection neural network and a second target detection neural network may be included, the first target detection neural network may be used to detect a person object in the images, and the second target detection neural network may be used to detect an item object in the images. In other embodiments of the present disclosure, target detection neural networks may be further subdivided, for example, a target detection neural network for detecting at least one of a body, a hand, and a face, and a target detection neural network for detecting at least one of a game currency and game currency. No specific limitation is made thereto in the present disclosure.

Through the above target detection processing, a detection result of a corresponding target object in at least one image may be obtained, the detection result may be represented as (label, x1, x2, y1, y2, score), where "label" represents a type label of the target object, for example, target objects such as a hand, a body, a face, a game currency, and a card respectively correspond to particular type labels to distinguish different target objects. (x1, y1) and (x2, y2) represent a position region of a bounding box of the detected target object in the image, and "score" represents the confidence score (probability value) of the target object corresponding to the label being in the position region. In other embodiments, the detection results of the target objects may also be represented in other ways. No specific limitation is made thereto in the present disclosure. The target object in at least one image may be obtained based on the above.

Optionally, the surrounding information of a target object includes surrounding pixels of the target object in the image, or a feature extracted from the surrounding pixels of the target object. Since different images are acquired from the same scene in different views, the surrounding information of the same target object in two images is also slightly different. Based on this, in the process of determining the association relationships between the target objects in the first image and the second image, the association relationships are determined according to the surrounding information of the target objects in the two images. Two target objects having an association relationship represent the same target object. Exemplarily, the first image and the second image are images acquired from the same scene in different views; there are three apples in the scene, i.e., apple 1, apple 2 and apple 3; both the first image and the second image include apple 1, apple 2 and apple 3; correspondingly, apple 1 in the first image is associated with apple 1 in the second image (that is, they are the same item), apple 2 in the first image is associated with apple 2 in the second image, and apple 3 in the first image is associated with apple 3 in the second image.

In the embodiments of the present disclosure, the target object detected in an image acquired in one view of the game tabletop may include the face, hand, and body of a person object. Since there may be many people near the game tabletop, it is necessary to match and associate faces, hands, and bodies in the images to obtain the faces, bodies, and hands of the same person objects. Detection results of performing target detection processing on an image may include detection results of the face, body, and hand in the image, that is, may include bounding boxes of position regions where the face, body and hand are located, so that image regions corresponding to the bounding boxes of the face, body and hand in the image are obtained. In the embodiments of the present disclosure, whether a face bounding box and a body bounding box relate to the same person object may be determined according to the area Intersection Over Union (IOU) corresponding to the face bounding box and the body bounding box, and whether a hand bounding box and a body bounding box relate to the same person object may be determined according to the area IOU corresponding to the hand bounding box and the body bounding box. It may be determined that two boxes correspond to the same person object if the area IOU is greater than an area IOU threshold.

Or whether a face bounding box, a body bounding box and a hand bounding box relate to the same person object is determined by means of the distances therebetween, or whether the corresponding face, body and hand relate to the same person object is determined by means of an included angle between a connecting line between an elbow key point and a hand key point in the body bounding box and a connecting line between hand key points in the hand bounding box.

In this way, bounding boxes of the body, hand, and face of the same person object may be determined. Then the same person label may be assigned to the body, face and hand of the same person object, to distinguish different person objects.

In the embodiments, the appearance information of the target object may include pixel information in a region where the target object is located. In some embodiments, a region where the target object is located may be labeled by a bounding box, and pixel information in the bounding box may be taken as appearance information. In some embodiments, images including target objects may be processed via a target detection network to obtain a first image and a second image including bounding boxes corresponding to the target objects, and pixel information in the bounding boxes of the target objects in the first image and the second image is taken as appearance information of the target objects.

In the embodiments, after the bounding boxes of the target objects in the first image and the second image are determined, surrounding information of the target objects may be determined based on the bounding boxes of the target objects.

In some optional embodiments of the present disclosure, determining the surrounding information of the target objects may include: expanding a region where a bounding box of the target object is located, and determining an expanded specific region, where the specific region is larger than the region where the bounding box is located, and the specific region includes the region where the bounding box is located; and determining pixel information within the specific region and outside the bounding box as surrounding information of the target object.

In the embodiments, a region where a bounding box of the target object is located may be enlarged according to a preset ratio, for example, for the four sides of the region where the bounding box is located, enlarging the corresponding side lengths by 20% to obtain a specific region; and pixel information corresponding to a region within the specific region and outside the bounding box is taken as surrounding pixel information of the target object.

In the embodiments, feature extraction may be performed on the surrounding information and the appearance information of the target objects in the first image, and feature extraction may be performed on the surrounding information and the appearance information of the target objects in the second image. Features of the surrounding information and features of the appearance information of a target object in the first image and a target object in the second image are matched to determine a similarity between the target object in the first image and the target object in the second image, and an association relationship between the two objects is determined based on the similarity.

Figure 4:
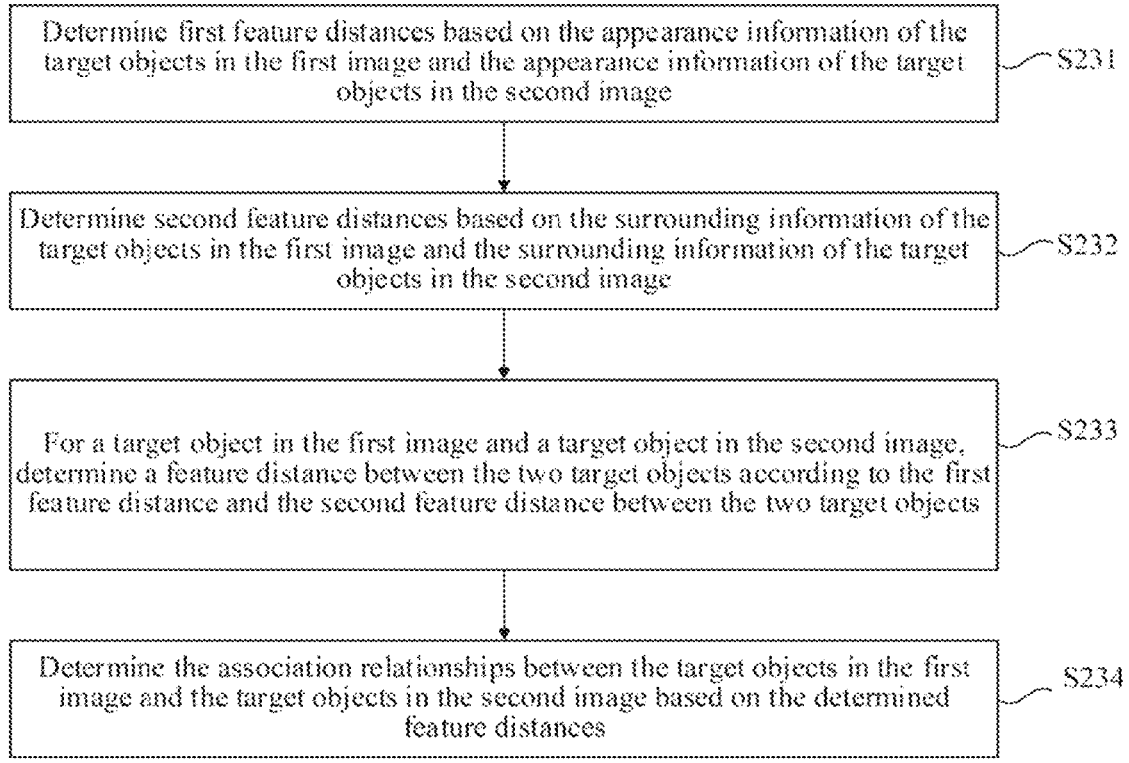
FIG. 4 shows a flowchart of step S23 in an image processing method according to embodiments of the present disclosure.

FIG. 4 shows a flowchart of step S23 in an image processing method according to embodiments of the present disclosure. Determining the association relationships between the target objects in the first image and the target objects in the second image based on the appearance information and the surrounding information of the target objects in the first image and the appearance information and the surrounding information of the target objects in the second image includes the following steps.

At S231, first feature distances are determined based on the appearance information of the target objects in the first image and the appearance information of the target objects in the second image, where a first feature distance represents a similarity between a target object in the first image and a target object in the second image.

At S232, second feature distances are determined based on the surrounding information of the target objects in the first image and the surrounding information of the target objects in the second image, where a second feature distance represents a similarity between the surrounding information of a target object in the first image and the surrounding information of a target object in the second image.

At S233, for a target object in the first image and a target object in the second image, a feature distance between the two target objects is determined according to the first feature distance and the second feature distance between the two target objects.

At S234, the association relationships between the target objects in the first image and the target objects in the second image are determined based on the determined feature distances.

In the embodiments, feature extraction may be performed on the appearance information and the surrounding information of the target objects in the first image and the second image via a feature extraction network, separately. First appearance features of the target objects in the first image and second appearance features of the target objects in the second image may be obtained respectively through the feature extraction on the appearance information. First surrounding features corresponding to the target objects in the first image and second surrounding features of the target objects in the second image may be obtained respectively through the feature extraction on the surrounding information. Exemplarily, the feature extraction network may include one or more convolutional layers, convolution processing may be performed on pixel information in bounding boxes of the target objects in the first image and the second image by means of the one or more convolutional layers to obtain first appearance features corresponding to the target objects in the first image and second appearance features corresponding to the target objects in the second image, and convolution processing may be performed on pixel information corresponding to the surrounding information of the target objects in the first image and the second image by means of the one or more convolutional layers to obtain first surrounding features corresponding to the target objects in the first image and second surrounding features corresponding to the target objects in the second image.

In the embodiments, if the target object in the first image is denoted as a first object and the target object in the second image is denoted as a second object, a first feature distance may be determined based on the first appearance feature of the first object in the first image and the second appearance feature of the second object in the second image. The first feature distance represents the similarity between the first object and the second object. The greater the first feature distance, the lower the similarity between the first object and the second object. Correspondingly, the smaller the first feature distance, the higher the similarity between the first object and the second object. In addition, a second feature distance is determined based on the first surrounding feature corresponding to the first object and the second surrounding feature corresponding to the second object. The second feature distance represents the similarity between the surrounding information of the first object and the surrounding information corresponding to the second object. The greater the second feature distance, the lower the similarity between the surrounding information of the first object and the surrounding information of the second object. Correspondingly, the smaller the second feature distance, the higher the similarity between the surrounding information of the first object and the surrounding information of the second object.

Further, a feature distance between the first object and the second object may be obtained based on the first feature distance and the second feature distance, and an association relationship between the first object and the second object may be determined based on the feature distance.

In some optional embodiments, an L2 distance may be calculated based on the first appearance feature and the second appearance feature, and the L2 distance is taken as the first feature distance; and correspondingly, an L2 distance may be calculated based on the first surrounding feature and the second surrounding feature, and the L2 distance is be taken as the second feature distance.

Exemplarily, the L2 distance satisfies:

$$d_2(I_1, I_2) = \sqrt{\sum_P (I_1^P - I_2^P)^2} \quad (1)$$

Taking the above L2 distance being the first feature distance as an example, $I_1$ and $I_2$ respectively represent the first appearance feature and the second appearance feature, and P represents the dimensions of the first appearance feature and the second appearance feature; and $d_2(I_1, I_2)$ represents the L2 distance between the first appearance feature and the second appearance feature. Correspondingly, when the above L2 distance is the second feature distance, it is similar, $I_1$ and $I_2$ respectively represent the first surrounding feature and the second surrounding feature, and P represents the dimensions of the first surrounding feature and the second surrounding feature; and $d_2(I_1, I_2)$ represents the L2 distance between the first surrounding feature and the second surrounding feature.

In some optional embodiments, determining the feature distance between the two target objects according to the first feature distance and the second feature distance between the two target objects includes: performing weighted summation on the first feature distance and the second feature distance between the two target objects to obtain the feature distance between the two target objects, where the higher the similarity between the two target objects, the greater a weight coefficient of the second feature distance between the two target objects during weighted summation.

In the embodiments, weighted summation processing may be performed on the first feature distance and the second feature distance to obtain the feature distance between the first object and the second object. The greater the feature distance, the smaller the association between the first object and the second object; correspondingly, the smaller the feature distance, the greater the association between the first object and the second object. In some optional embodiments, if the feature distance is greater than a first preset threshold, it may be determined that the first object is not associated with the second object; and if the feature distance is less than a second preset threshold, it may be determined that the first object is associated with the second object, where the second preset threshold is less than the first preset threshold, and the values of the first preset threshold and the second preset threshold may be determined according to multiple experiments or tests.

In the embodiments, the higher the similarity between the two target objects, the greater the weight coefficient of the second feature distance between the two target objects during weighted summation. It may be understood that, the more similar the two target objects, the more need to refer to the second feature distance between the surrounding information of the target objects in the process of association matching between the target objects.

In some optional embodiments, multiple weight coefficients may be pre-configured based on different similarities between the first appearance features and the second appearance features, and according to the similarity between the current first appearance feature and the current second appearance feature, one weight coefficient is selected from the multiple configured weight coefficients as the weight coefficient of the second feature distance between the two objects.

In some other optional embodiments, the above feature distance satisfies:

$$d^{ab} = \lambda \times \left(1\lambda \times D\left(\left(V_{I2}, {}^a_{app} V\right)\right) + {}^b_{app} D\ V, V_{I2}\ a\ b\ sur\ sur\right) \quad (2)$$

$$\lambda = S_C(V_{app}^a,)V_{app}^b \quad (3)$$

where $d^{ah}$ represents the feature distance, $\lambda$ is the weight coefficient, represents the first feature distance (for example, L2 distance) between the first appearance feature $V_{app}^a$ and the second appearance feature $V_{app}^b$, $D_{12}(V_{sur}^a, V_{sur}^b)$ represents the second feature distance (for example, L2 distance) between the first surrounding feature $V_{sur}^a$ and the second surrounding feature $V_{sur}^b$, and $S_C$ represents cosine similarity. That is, the weight coefficient $\lambda$ is obtained by calculating the cosine similarity between the first appearance feature $V_{app}^a$ and the second appearance feature $V_{app}^b$.

Figure 5:
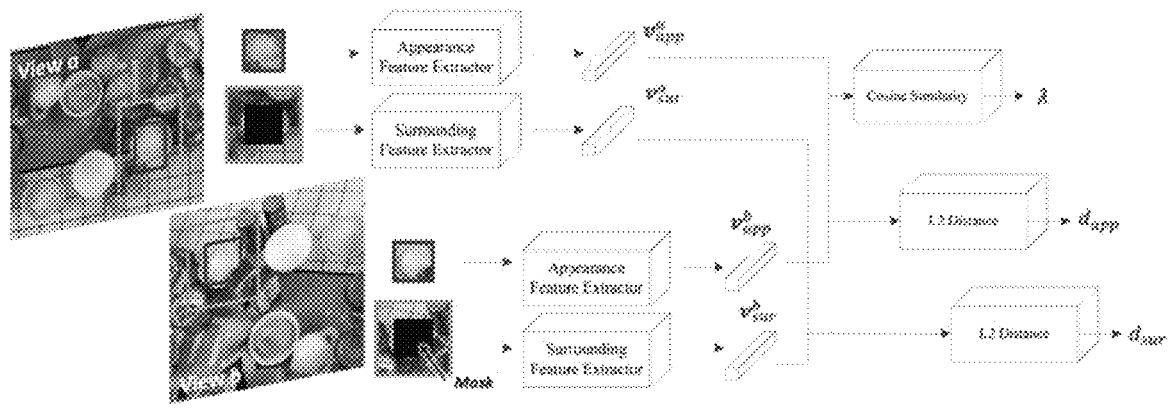
FIG. 5 shows a schematic diagram of feature distance determination in an image processing method according to embodiments of the present disclosure.

FIG. 5 shows a schematic diagram of feature distance determination in an image processing method according to embodiments of the present disclosure. For the above process, reference may be made to, for example, FIG. 5. Taking two images being respectively denoted as image a (View a) and image b (View b) as an example, image a includes a bounding box of a target object (denoted as the first object) and a region corresponding to the surrounding information (denoted as the first specific region), image b includes a bounding box of a target object (denoted as the second object) and a region corresponding to the surrounding information (denoted as the second specific region), and pixel information in the bounding boxes of the target objects and pixel information in the first specific region are respectively segmented from image a and image b. In practical application, to obtain a region corresponding to the surrounding information, an expanded region of a region where the bounding box is located may be segmented from image a or image b, and then, the region corresponding to the bounding box in the segmented region is covered by a mask having the same size as the bounding box, so as to obtain pixel information in the first specific region and the second specific region.

Further, feature extraction may be performed on the pixel information in the bounding boxes and the pixel information in the specific regions (including the first specific region and the second specific region) respectively through two feature extractors. For example, feature extraction is performed on the pixel information in the corresponding bounding boxes and the pixel information in the specific regions (including the first specific region and the second specific region) in image a and image b through an appearance feature extractor to obtain a first appearance feature $V_{app}^a$ corresponding to the first object and a second appearance feature $V_{app}^b$ corresponding to the second object; and feature extraction is performed on the pixel information in the first specific region in image a and the second specific region in image b through a surrounding feature extractor to obtain a first surrounding feature $V_{sur}^a$ and a second surrounding feature $V_{sur}^b$. Then the cosine similarity between the first appearance feature $V_{app}^a$ and the second appearance feature $V_{app}^b$ is calculated to obtain the weight coefficient λ. The L2 distance between the first appearance feature $V_{app}^a$ and the second appearance feature $V_{app}^b$ is calculated to obtain the feature distance $d_{app}$ between the first object and the second object; and the L2 distance between the first surrounding feature $V_{sur}^a$ and the second surrounding feature $V_{sur}^b$ is calculated to obtained the feature distance $d_{sur}$ between the first surrounding feature and the second surrounding feature. Finally, the feature distance between the first object and the second object is obtained by the above formula (2).

By means of the technical solutions of the embodiments of the present disclosure, surrounding information of target objects in different images is taken as the basis for association matching between the target objects of different images, so that the association matching between items with a similar or same appearance in two images is implemented, thereby improving the accuracy of association matching.

Figure 6:
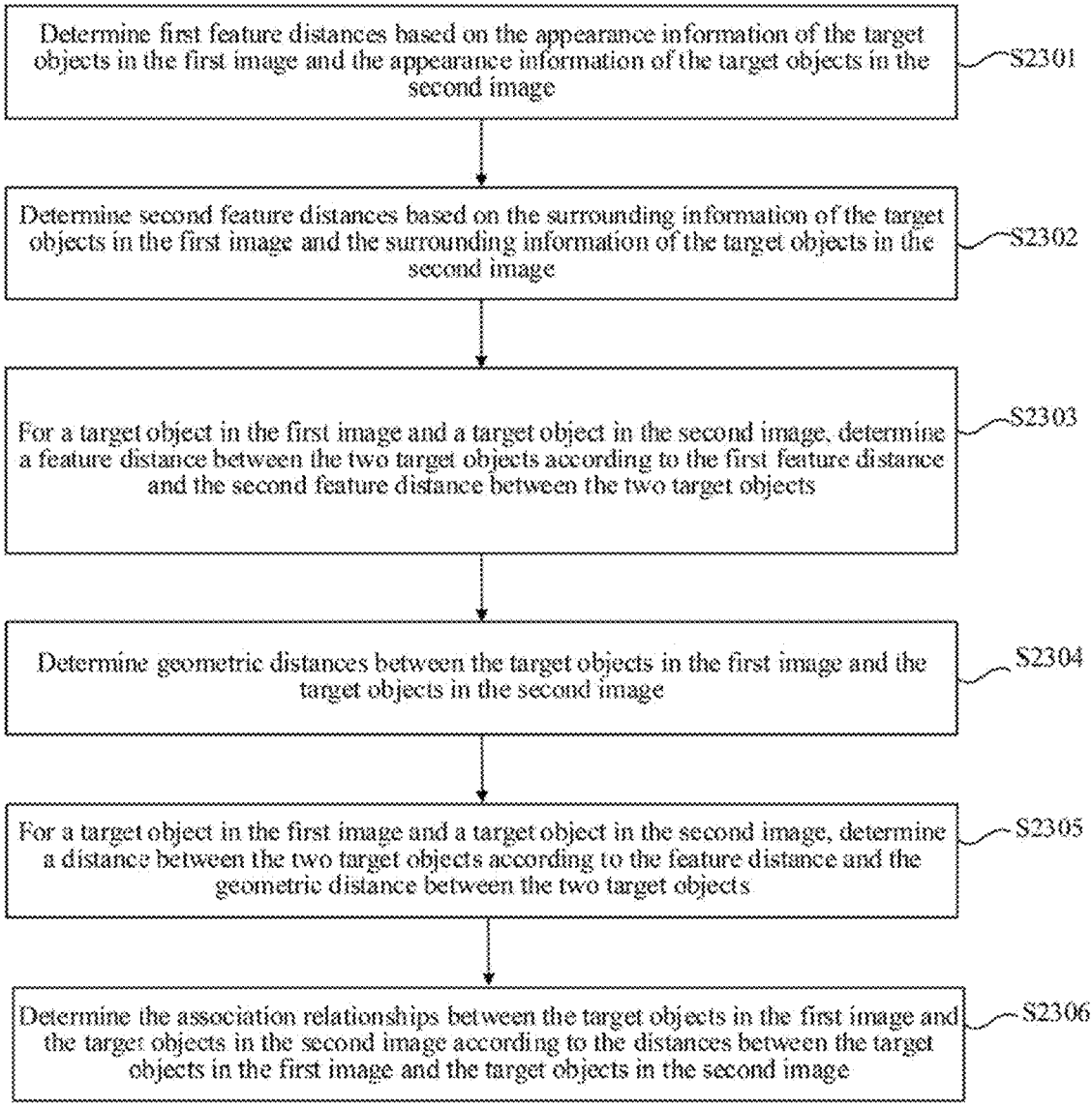
FIG. 6 shows another flowchart of step S23 in an image processing method according to embodiments of the present disclosure.

The embodiments of the present disclosure further provide another method for associating target objects. FIG. 6 shows another flowchart of step S23 in an image processing method according to embodiments of the present disclosure. As shown in FIG. 6, the method includes the following steps.

At S2301, first feature distances are determined based on the appearance information of the target objects in the first image and the appearance information of the target objects in the second image, where a first feature distance represents a similarity between a target object in the first image and a target object in the second image.

At S2302, second feature distances are determined based on the surrounding information of the target objects in the first image and the surrounding information of the target objects in the second image, where a second feature distance represents a similarity between the surrounding information of a target object in the first image and the surrounding information of a target object in the second image.

At S2303, for a target object in the first image and a target object in the second image, a feature distance between the two target objects is determined according to the first feature distance and the second feature distance between the two target objects.

At S2304, geometric distances between the target objects in the first image and the target objects in the second image are determined.

At S2305, for a target object in the first image and a target object in the second image, a distance between the two target objects is determined according to the feature distance and the geometric distance between the two target objects.

At S2306, the association relationships between the target objects in the first image and the target objects in the second image are determined according to the distances between the target objects in the first image and the target objects in the second image.

For details of S2301 to S2303 in the embodiments, reference may be made to the description in the foregoing embodiments, and details are not described herein again.

In some optional embodiments of the present disclosure, determining the geometric distances between the target objects in the first image and the target objects in the second image includes: obtaining a first position of a first image acquisition device that acquires the first image and a second position of a second image acquisition device that acquires the second image, and obtaining first internal parameters of the first image acquisition device and second internal parameters of the second image acquisition device; determining a third position, in the first image, of a center point of the target object in the first image; determining an epipolar line in the second image based on the first position, the second position, the third position, the first internal parameters and the second internal parameters, where the epipolar line represents a straight line of a connecting line, between the center point of the first object and an image point of the center point on an imaging plane in the first image, projected into the second image; determining a vertical pixel distance between the target object in the second image and the epipolar line; and determining the geometric distances between the target objects in the first image and the target objects in the second image according to the determined vertical pixel distances.

In order to allow target objects in two images establish association matching in a scenario where the target objects have both the same or similar appearance and similar surrounding information, in the embodiments, the above epipolar geometry mode is used for constraint, to implement target object association matching in the above scenario, thereby improving the accuracy of association matching.

In the embodiments, the first image and the second image are images acquired in different views. It is assumed that the first image corresponds to a first view and the second image corresponds to a second view. For a first object in the first image which is any target object in the first image, the center point of the first object is projected to point P on the imaging plane of the first image acquisition device, and a straight line is formed by connecting the center point and point P, where the straight line is a straight line in the first view corresponding to the first image. The straight line is projected into the second image to obtain an epipolar line in the second view corresponding to the second image.

In practical application, a relative position relationship between the first image acquisition device and the second image acquisition device may be determined by the first position of the first image acquisition device and the second position of the second image acquisition device; a conversion relationship may be determined based on the relative position relationship, the first internal parameters of the first image acquisition device, and the second internal parameters of the second image acquisition device; coordinates of a connecting line between the center point and the third position in the first image may be determined based on the third position of the center point of the first object in the first image; and the coordinates of the connecting line between the center point and the third position in the first image are converted based on the above conversion relationship, to obtain coordinates of the epipolar line in the second image.

It may be understood that, if the first object in the first image is associated with the second object in the second image, that is, the first object and the second object are the same object, and after the epipolar line in the second image is determined, the vertical pixel distance from the second object among the target objects in the second image to the epipolar line is the smallest, or even 0. The above vertical pixel distance is also the geometric distance between the two target objects in the first image and the second image.

Therefore, which target object in the second image is associated with the first object in the first image is determined by determining the vertical pixel distances between the target objects in the second image and the epipolar line.

In some optional embodiments of the present disclosure, determining the distance between the two target objects according to the feature distance and the geometric distance between the two target objects includes: performing weighted summation on the feature distance and the geometric distance between the two target objects to obtain the distance between the two target objects.

In the embodiments, the distance between a pair of first object and second object is obtained by performing weighted summation processing on the feature distance and the geometric distance. The weight coefficient used in weighted summation processing may be a fixed preset value, and the value of the weight coefficient is not limited in the embodiments.

In some optional embodiments of the present disclosure, determining the association relationships between the target objects in the first image and the target objects in the second image according to the distances between the target objects in the first image and the target objects in the second image includes: forming a distance matrix according to the distances between the target objects in the first image and the target objects in the second image, where the value of an element in the distance matrix represents the distance between a target object in the first image and a target object in the second image; and determining an adjacency matrix between the first image and the second image according to the distance matrix, where the value of an element in the adjacency matrix represents whether a target object in the first image is associated or not associated with a target object in the second image.

In the embodiments, a distance is obtained for a pair of first object and second object, then there may be M×N distances between M target objects in the first image and N target objects in the second image, and correspondingly, an M×N distance matrix may be formed. Assuming that there are three objects in image 1 and image 2, a 3×3 distance matrix may be formed; the distance matrix is processed according to a preset algorithm to obtain an adjacency matrix, where a pair of target objects with a value of 1 in the adjacency matrix are associated, and a pair of target objects having a value of 0 in the adjacency matrix are not associated. Exemplarily, the adjacency matrix may be obtained according to the distance matrix by means of a Kuhn-Munkres algorithm (KM algorithm for short).

In addition, in the embodiments of the present disclosure, the target objects may include a person object and an item object, different item objects may have different item labels, and the item label may include at least one of color, pattern, size, and value. For example, the outer edge of an item object may have an label such as pattern and color and the corresponding value of the item object may be determined by identifying the feature such as pattern and color, or the surface of the item object may also have information such as value and the value of the target object may also be obtained by identifying this feature. In the embodiments of the present disclosure, when an item object in an image is detected, an item label of the item object may be further identified, so as to determine the value of the item object.

In addition, in the embodiments of the present disclosure, when association results between target objects in images in different views are determined, the same object label may be assigned to the same target object, and different object labels may be assigned to different target objects, to establish association relationships between the target objects in the images acquired in different views, that is, target objects having the same object label in the images acquired in different views are the same target object. Through the above configuration, an association between the same target objects in at least one obtained image may be established, the same object label may be assigned to the same target object, and different object labels may be assigned to different target objects, thereby implementing association between target objects in different images.

In some possible implementations, a target object may be blocked during a game, the position of the target object may continuously change over time, and the blocking may cause the target object to be undetectable in a frame or frames. In the embodiments of the present disclosure, according to tracking results of the target object in images in adjacent time frames, a missing target object may be corrected, an erroneous bounding box may be corrected, and a missing bounding box may be added. That is, a bounding box correction operation may be further performed after step S21 or S22. The bounding box correction operation may include:

In response to a first target object being not detected in a $k^{th}$ image frame or the first target object in the $k^{th}$ image frame being blocked by the remaining target objects, and the first target object being detected in at least one of n image frames before the $k^{th}$ image frame and/or the first target object being detected in at least one of n image frames after the $k^{th}$ image frame, predicting the position of the first target object in the $k^{th}$ image frame according to the detected first target object, where k is an integer greater than or equal to 1, and n is an integer greater than or equal to 1.

Specifically, in the embodiments of the present disclosure, the result that the first target object is not detected in the $k^{th}$ frame may be corrected according to the first target object detected in an image obtained in a time frame before the $k^{th}$ frame and the first target object detected in an image obtained in a time frame after the $k^{th}$ frame, to determine the first target object in the $k^{th}$ image frame. The first target object is any target object detected in the image. In order to improve the accuracy of bounding box correction, the value of n in the embodiments of the present disclosure should be less than a set value, for example, the set value may be 3 or 5. No specific limitation is made thereto in the present disclosure.

In an example, according to the embodiments of the present disclosure, linear fitting processing may be performed based on the positions of the first target object respectively detected in the n image frames before the $k^{th}$ image frame and/or the positions of the first target object detected in the n image fames after the $k^{th}$ image frame, to obtain the position of the first target object in the $k^{th}$ image frame, that is, an image region corresponding to a bounding box of the first target object in the $k^{th}$ image frame.

Through the above configuration, in the embodiments of the present disclosure, when a target object is not detected or the target object is blocked, the position of a bounding box of the corresponding target object may be corrected or added, thereby improving the target object tracking effect and detecting accuracy.

Figure 7:
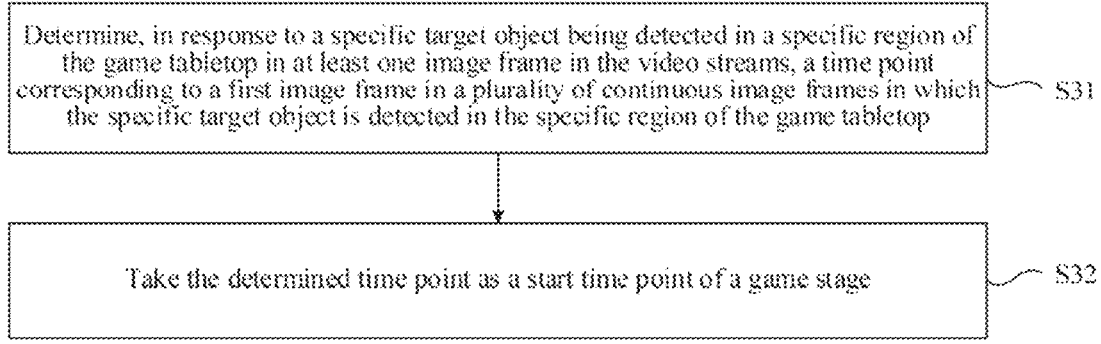
FIG. 7 shows a flowchart of step S30 in an image processing method according to embodiments of the present disclosure.

When the target objects in the images are obtained and the corresponding object labels are configured, the game stage in the game process may be further determined based on the target objects in the images. FIG. 7 shows a flowchart of step S30 in an image processing method according to embodiments of the present disclosure. Determining the current game stage based on the target objects includes the following steps.

At S31, in response to a specific target object being detected in a specific region of the game tabletop in at least one image frame in the video streams, a time point corresponding to a first image frame in a plurality of continuous image frames in which the specific target object is detected in the specific region of the game tabletop is determined.

At S32, the determined time point is taken as a start time point of a game stage.

In the embodiments of the present disclosure, when a specific target object is detected in at least one image frame in the video streams, a time point corresponding to a first image frame in a plurality of continuous image frames in which the specific target object is detected may be determined as a start time point of a game stage, so as to switch the game progress stage at the start time point of the game stage. Through the process above, the game progress stage may be automatically switched based on detection of the specific target object in the video streams, thereby ensuring the rhythm of the game, saving hardware costs, saving the game time, and improving efficiency.

In the embodiments of the present disclosure, a first image frame in a plurality of continuous image frames in which the specific target object is detected in a video stream in one view may be determined; a synchronous image acquired synchronously with the first image frame is determined from a video stream synchronously acquired in another view; and in response to the specific target object being detected in at least one of N image frames before the synchronous image, a time point corresponding to an image in which the specific target object is detected earliest among the N image frames before the synchronous image is determined as a start time point of a game stage.

It should be noted that since a game may be played for a plurality of rounds, the video streams may include video streams acquired in a plurality of views in at least one round. In order to distinguish different rounds of the game, a plurality of image frames in which the specific target object is continuously acquired may be determined as images of one round of the game, and therefore, a first image frame in a plurality of image frames in which the specific target object is detected may be respectively obtained from a video stream in a plurality of views.

If the plurality of views includes a side view and a bird view, and the side view includes a left view of the game tabletop and/or a right view of the game tabletop, in the video stream in a plurality of views, for example, the video stream in the left view of the game tabletop, the right view of the game tabletop, or the bird view, the first image frame in the plurality of continuous image frames in which the specific target object is detected is respectively determined, and it is assumed that the first image frame in the plurality of continuous image frames in which the specific target object is detected in a first view (such as the left view) in a certain round is image a.

For example, when the current view is the left view, and there is one or more other views, assuming that the other view includes the right view of the game tabletop and/or the bird view of the game tabletop, the first image frame corresponding to the left view of the game tabletop, i.e., a synchronous image synchronously acquired with image a, is determined from a video stream synchronously acquired in another view. Correspondingly, the number of synchronous images may also be one or more.

In the embodiments of the present disclosure, in one round of the game, the specific target object may be detected in the video streams synchronously acquired in the plurality of views, and in order to distinguish different rounds of the game during switching of the game progress stage, and reduce a probability that a time point where the specific target object is detected in the last round of the game will be used as the time point for switching the game progress stage in the present round of the game, the value range of N may be limited. For example, N may be determined according to the average duration of a round of the game, the average duration of the game progress stages, and an image acquisition frequency, so as to ensure that N image frames before the synchronous image belong to the same round of the game. N is greater than or equal to 1 and less than or equal to 30.

The foregoing is merely an example for describing the value range of N, and the value of N may be limited in the same game, and is limited based on the game time. No limitation is made thereto in the present disclosure.

Assuming that the first image frame in the left view of the game tabletop is image a, the synchronous image synchronously acquired in the bird view with image a is image b, and the specific target object may also be detected in at least one of N image frames before image b, it may be considered that the specific target object is blocked in a period of time before image a is acquired in the left view of the game tabletop, resulting in that the earliest time point, when the target object appears, determined in the images acquired in the left view of the game tabletop in the present round of the game is incorrect, and in this case, the game stage may be switched at a time point corresponding to an image in which the specific target object is detected earliest among the N image frames before image b in the images acquired in the bird view.

If video streams acquired in three or more views are obtained, a synchronous image of the first image frame can be found in a plurality of views. If it is determined that the specific target object may be detected in at least one of N image frames before the synchronous image in each of at least two views, a plurality of time points corresponding to an image in which the target object is detected earliest among the N image frames before the synchronous image in each of the at least two views is determined, the earliest time point is found from the time points, and the game progress stage is switched at the earliest time point, so that the game progress stage is switched at the earliest time point when the specific target object appears in a round of the game. Therefore, it is more accurate to determine a game progress stage according to video streams acquired in a plurality of views than to determine a game stage according to a video stream acquired in a single view.

In the embodiments of the present disclosure, if the specific target object is not detected in the N image frames before each of the synchronous images in different views, it indicates that in the present round of the game, the time point when the specific target object first appears in the specific region of the game tabletop is the time point corresponding to the first image frame, and therefore, the time point corresponding to the first image frame may be taken as the start time point of a game stage.

In some optional embodiments, determining, in response to the specific target object being detected in the specific region of the game tabletop in the at least one image frame in the video streams, the time point corresponding to the first image frame in the plurality of continuous image frames in which the specific target object is detected in the specific region of the game tabletop includes:

determining, in response to a game currency being detected in a game participation region of the game tabletop in the at least one image frame in the video streams, a time point corresponding to a first image frame in a plurality of continuous image frames in which a game currency is detected in a game participation region of the game tabletop; and taking the determined time point as the start time point of the game stage includes:

taking the determined time point as a start time point of a first game stage.

The game participation region may be a betting region, that is to say, at the time point corresponding to the first image frame in the plurality of continuous image frames in which a game currency is detected in a betting region of the game tabletop, it is determined that the first game stage (a betting stage) starts.

In some optional embodiments, determining, in response to the specific target object being detected in the specific region of the game tabletop in the at least one image frame in the video streams, the time point corresponding to the first image frame in the plurality of continuous image frames in which the specific target object is detected in the specific region of the game tabletop includes:

determining, in response to a game card being detected in a game play region of the game tabletop in the at least one image frame in the video streams, a time point corresponding to a first image frame in a plurality of continuous image frames in which a game card is detected in the game play region of the game tabletop; and taking the determined time point as the start time point of the game stage includes:

taking the determined time point as an end time point of a first game stage and a start time point of a second game stage.

That is, the time point corresponding to the first image frame in the plurality of continuous image frames in which a game card is detected in the game play region of the game tabletop is determined as the end time point of the first game stage (the betting stage) and the start time point of the second game stage (a card give-out stage), and the game stage may be switched from the first game stage to the second game stage at this time point.

In the embodiments of the present disclosure, if a game card is detected in the game play region of the game tabletop in a plurality of continuous image frames in the video streams, it indicates that the present round of the game is already in the second game stage, Therefore, the time point corresponding to the first image frame in the plurality of continuous image frames in which a game card is detected in the game play region of the game tabletop may be taken as the time point for switching the game stage from the first game stage to the second game stage.

In some optional embodiments, after switching from the first game stage to the second game stage, if it is detected that a game participation result in a game participation region of the game tabletop changes, for example, if it is detected that a game currency involved in betting in a betting region of the game tabletop changes, prompt information is issued to ensure the fairness of the game. The prompt information may be voice prompt information.

In the embodiments of the present disclosure, in each round of the game, after switching from the first game stage to the second game stage, if it is detected in images of the second game stage that a game currency involved in betting in a betting region of the game tabletop changes, for example, a certain game player adds a betting game currency, it may be determined that the betting game currency in the change is an invalid game currency. In the embodiments of the present disclosure, if a certain player adds a betting game currency, according to rules of the game, it is determined that the betting game currency added by the game player after entering the second game stage is an invalid game currency, or it is determined that all the betting game currencies of the game player are invalid game currencies. No limitation is made thereto in the present disclosure.

In some optional embodiments, if it is detected in the second game stage that the type, position, or appearance order of a game card in the game play region of the game tabletop is different from a preset rule, prompt information is issued to prompt the game dealer that the cards are given out incorrectly, and the prompt information may also be voice prompt information.

In some optional embodiments, determining, in response to the specific target object being detected in the specific region of the game tabletop in the at least one image frame in the video streams, the time point corresponding to the first image frame in the plurality of continuous image frames in which the specific target object is detected in the specific region of the game tabletop includes:

determining, in response to the number of game cards or the sum of points thereof in the game play region of the game tabletop being detected to reach a preset condition in the at least one image frame in the video streams, a time point corresponding to a first image frame in a plurality of continuous image frames in which the number of game cards or the sum of points thereof in the game play region of the game tabletop is detected to reach the preset condition; and taking the determined time point as the start time point of the game stage includes:

taking the determined time point as an end time point of a second game stage and a start time point of a third game stage.

In specific implementation, the number of game cards and the points of the game cards in the game play region of the game tabletop may be detected in the second game stage, and at a time point corresponding to a first image frame of a plurality of continuous image frames in which the number (for example, 6 game cards) or the sum of points is detected to satisfy a card give-out end rule, it is determined that the second game stage (the card give-out stage) ends, and the third game stage (a payment stage) starts.

After the start time point and end time point of the game stages are determined, the game stage may be automatically switched, thereby saving labor costs and improving game efficiency.

In some optional embodiments, determining the game detecting results according to the target objects and the determined game stage includes:

determining game results according to positions and points of game cards in a game play region of the game tabletop at an end time point of a second game stage.

In some optional embodiments, in the third game stage, determining the game detecting results according to the target objects and the determined game stage includes:

determining payment results of players according to game results determined at the end of a second game stage, game participation results of the players at the end of a first game stage, and payment rules. Thus, the work of the game dealer is reduced and negligence or an error caused by manual calculation can be suppressed.

Figure 8:
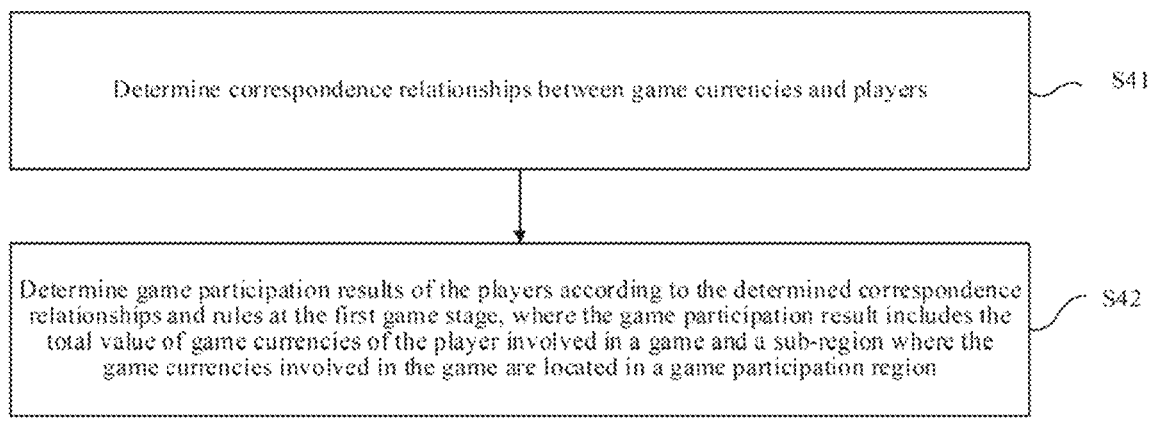
FIG. 8 shows a flowchart of detecting a first stage in an image processing method according to embodiments of the present disclosure.

In some optional embodiments, in a first game stage, game currencies of players (i.e., game players) involved in the game may be recorded. FIG. 8 shows a flowchart of detecting a first game stage in an image processing method according to embodiments of the present disclosure. Obtaining the game detecting results according to the target objects detected in the images and the determined game stage includes the following steps.

At S41, correspondence relationships between game currencies and players are determined.

At S42, game participation results of the players are determined according to the determined correspondence relationships and rules at the first game stage, where the game participation result includes the total value of game currencies of the player involved in a game and a sub-region where the game currencies involved in the game are located in a game participation region.

In the embodiments of the present disclosure, determining the correspondence relationships between the game currencies (exchange items) and the players may include: determining, according to positions of the players and positions of game participation regions, a player associated with the game participation region. This step may include: if a distance between the position of a player and a game participation region is less than or equal to an association distance threshold, determining that the player is associated with the game participation region.

In the embodiments of the present disclosure, the item label of a game currency may be obtained when the game currency is recognized. Different item objects may have different item labels, and the item label may include at least one of color, pattern, size, and value. By means of images acquired in a side view, item labels of item objects in the game tabletop may be easily detected. In addition, in the embodiments of the present disclosure, it may be determined according to images of the first game stage whether the item label of an item object in a game participation region matches the position information of the current game participation region for placement, and if the item label does not match the position information, an alarm operation is performed. The alarm operation may include giving a voice prompt, and sending prompt information that the item label does not match the position information to a preset electronic device, thereby conveniently detecting the item object in the first game stage.

In addition, in the embodiments of the present disclosure, a game participation region may include a plurality of sub-regions, and each sub-region may be used to place a game currency involved in the game. In the embodiments of the present disclosure, the total value of the game currencies in the sub-regions of the game participation region in the first game stage may be further calculated.

The second game stage may be a stage where game cards are given out to game players, where each game card may have a corresponding numerical symbol and pattern, and the numerical symbol and pattern may also be the item label of the game card. In addition, in the embodiments of the present disclosure, a person object corresponding to game cards may be determined according to the area IOU between the position of the game cards and the hand position of the person object (a game player or a game dealer), so that the game cards corresponding to the person object may be obtained. On this basis, a game result may be obtained at the end of the second game stage according to the identified numerical symbols and patterns of the game cards of the person object. Different table games may have different rules for determining whether the game wins or loses. No specific limitation is made thereto in the embodiments of the present disclosure.

In some possible implementations, in the third game stage, payment operations of an operator (such as the game dealer) may be detected to determine whether payment results performed by the operator are consistent with the determined payment results, where the payment results may be determined according to the game results determined at the end of the second game stage, the game participation results of the players at the end of the first game stage, and the payment rules. Thus, cheating can be suppressed.

Figure 9:
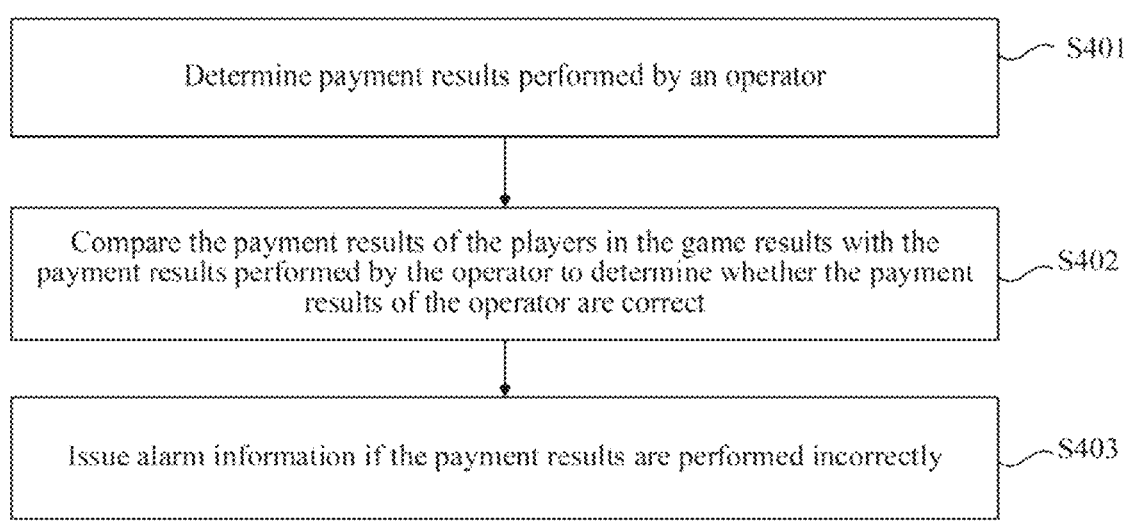
FIG. 9 shows a flowchart of detecting a third stage in an image processing method according to embodiments of the present disclosure.

FIG. 9 shows a flowchart of detecting a third game stage in an image processing method according to embodiments of the present disclosure. Determining the game detecting results according to the target objects and the determined game stage includes the following steps.

At S401, payment results performed by an operator are determined.

In some possible implementations, the total value of game currencies taken by the operator from a game participation region corresponding to at least one game player and the value of game currencies paid to a game player may be detected, and the above detection results are taken as the payment results performed by the operator.

At S402, the payment results of the players in the game results are compared with the payment results performed by the operator to determine whether the payment results of the operator are correct.

In some possible implementations, the detected payment results performed by the operator may be compared with the determined payment results to determine whether the performed payment results are consistent with the determined payment results. If not, it is considered that the payment results are performed incorrectly.

S403, alarm information is issued if the payment results are performed incorrectly.

If the performed payment results are consistent with the determined payment results, it is determined that the payment results are performed correctly; and if the performed payment results are inconsistent with the determined payment results, for example, if there are more game currencies in the performed payment than in the determined results, alarm information may be generated to prompt the operator. Similarly, the alarm information may be a voice prompt or a display output. However, no specific limitation is made thereto in the present disclosure.

The following is an example to illustrate the process in the embodiments of the present disclosure. As shown in FIG. 2, multiple camera lenses may be provided above the game tabletop to analyze the game on the tabletop in real time. The whole game process is divided into a first game stage, a second game stage and a third game stage according to the recognition results. In the first game stage, after each game player (a person object) places game currencies in a game participation region, each of the game currencies may be identified immediately, whether the game player's game currencies can be placed in the game participation region is determined, and at the end of the first game stage, the total value of the game currencies placed by each game player in the game participation region may be immediately calculated. In the second game stage, the system may automatically detect whether someone illegally changes a game currency in a game participation region of the game tabletop, for example, taking back a game currency, or adding a game currency, etc., and at the end of the second game stage, game results of each game player, i.e., win/loss of each game player and a corresponding payment result, may be calculated according to game cards in the game play region of the game tabletop. In the third game stage, performed payment results are checked according to the calculated payment results.

The solution of providing image acquisition devices is described in detail below. In the embodiments of the present disclosure, subtle changes on the tabletop needs to be acquired, such as the identification of the denomination (value) of a game currency, and therefore, three cameras (or camera lenses) may be arranged. The camera on the left of the operator is called Left view and photographs the left half of the tabletop; the camera on the right of the operator is called Right view and photographs the right half of the tabletop; and the camera above the operator's head is called Bird view, and photographs the entire tabletop in a bird view. Left view may be responsible for the detection and recognition of a face, a game currency, a body, and a hand at the left half, Right view may be responsible for the detection and recognition of a face, a game currency, a body, and a hand at the right half, and Bird view may be responsible for the detection and recognition of game currency and a card and coordination of the entire tabletop.

During the detecting process, in the embodiments of the present disclosure, the following operations may be performed.

Step 1: By decoding video streams from the three cameras, the video frames from the three cameras are obtained and input into an operation subject in the embodiments of the present disclosure.

Step 2: The system in the embodiments of the present disclosure may detect faces, hands, bodies and game currencies in two videos from Left view and Right view, and detect game currencies, hands, cards and currency in a video from Bird view.

Step 3: Each type of object detected in step 2 is tracked. The so-called tracking is to associate an item in successive video frames and assign a unique number label thereto.

Step 4: As the position of an item continuously changes over time, sometimes the bounding box is not accurate enough, and sometimes the item cannot be detected in a frame or frames due to blocking. The detection results may be corrected to correct an erroneous bounding box and add a missing bounding box.

Step 5: According to a bounding box, a small image of an item is cut out from an input video frame, features of faces are extracted and game currencies are identified in Left view and Right view, and card symbols of game cards are identified in Bird view.

Step 6: Because Left view camera and Right view camera are respectively responsible for the scenes in the left and right regions of the tabletop, and in actual situations, a player may be in the middle region and may be photographed by both the left and right cameras, calculation may be performed on the same person repeatedly. Therefore, fusion is needed to eliminate duplicate recognition.

Step 7: For tabletop item mapping, Bird view camera performs overall coordination on the tabletop, and can photograph all the game cards, currency and game currencies on the tabletop. Left view camera and Right view camera may photograph a part of the tabletop, so it is necessary to map game currencies photographed by Left view camera and Right view camera to the image captured by Bird view camera.

Step 8: In the embodiments of the present disclosure, information of game currencies placed by a game player in a game participation region of the game tabletop may be obtained. In this step, the detection, tracking, and recognition results in steps 1 to 6 are integrated for management, and the game currencies in the game participation region of the game tabletop are enabled to correspond to a certain game player by the side of a game table.

Step 9: Steps 1 to 8 are the entire process of processing a frame in the video streams. By processing each frame in the video streams, the current game stage of the game is determined. If it is in the first game stage, game participation of the game players is determined; if it is in the second stage, card give-out is automatically detected, and game results and payment results of the game players are calculated to prevent someone from changing the tabletop environment; and if it is in the third stage, whether the payment is correct is automatically checked.

In the embodiments of the present disclosure, images about a game tabletop are obtained, target objects in the images are detected by performing target detection processing on the images, the current game stage of the game is determined based on the detected target objects, and detecting of the game tabletop is performed by means of the detected target objects and the determined game stage. It is convenient, quick and accurate. Moreover, detecting of the game process may be automatically performed, thereby facilitating implementation of large-scale and industrial operation.

In addition, compared with a manual mode at present, efficiency is greatly improved, the participation of workers and the need for professionals are reduced, large-scale operation is facilitated, the occurrence of errors is also reduced, and by acquiring images through image acquisition devices in different views, items on the tabletop, especially the values of item objects, may be accurately recognized and participants and other items on the tabletop may also be recognized.

A person skilled in the art may understand that, in the foregoing methods of the specific implementations, the order in which the steps are written does not imply a strict execution order which constitutes any limitation to the implementation process, and the specific order of executing the steps should be determined by functions and possible internal logics thereof.

It may be understood that the foregoing method embodiments mentioned in the present disclosure may be combined with each other to obtain a combined embodiment without departing from the principle and the logic. Details are not described in the present disclosure again due to space limitation.

In addition, the present disclosure further provides an image processing apparatus, an electronic device, a computer-readable storage medium, and a program. The above may be all used to implement any of the image processing methods provided in the present disclosure. For corresponding technical solutions and descriptions, refer to corresponding descriptions of the method section. Details are not described again.

Figure 10:
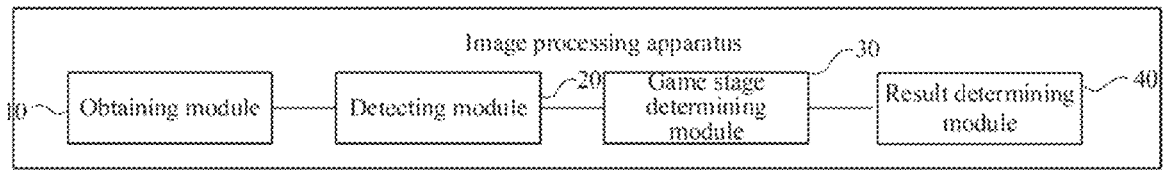
FIG. 10 shows a block diagram of an image processing apparatus according to embodiments of the present disclosure.

FIG. 10 shows a block diagram of an image processing apparatus according to embodiments of the present disclosure. According to FIG. 10, the image processing apparatus includes:

an obtaining module 10, configured to obtain video streams of a game tabletop;

a detecting module 20, configured to detect target objects in a plurality of image frames included in the video streams;

a game stage determining module 30, configured to determine a current game stage based on the target objects; and a result determining module 40, configured to determine game detecting results according to the target objects and the determined game stage.

In some possible implementations, the video streams include video streams synchronously acquired in a plurality of views of the game tabletop; and the detecting module is further configured to: perform target detection on a first image acquired in a first view to determine target objects in the first image; perform target detection on a second image synchronously acquired in a second view to determine target objects in the second image; and determine association relationships between the target objects in the first image and the target objects in the second image based on appearance information and surrounding information of the target objects in the first image and appearance information and surrounding information of the target objects in the second image, where the appearance information of a target object is determined according to pixels within a bounding box of the target object in an image in which the target object is located, and the surrounding information of a target object is determined according to pixels within a set range around a bounding box of the target object in an image in which the target object is located.

In some possible implementations, the detecting module is further configured to: determine first feature distances based on the appearance information of the target objects in the first image and the appearance information of the target objects in the second image, where a first feature distance represents a similarity between a target object in the first image and a target object in the second image; determine second feature distances based on the surrounding information of the target objects in the first image and the surrounding information of the target objects in the second image, where a second feature distance represents a similarity between the surrounding information of a target object in the first image and the surrounding information of a target object in the second image; for a target object in the first image and a target object in the second image, determine a feature distance between the two target objects according to the first feature distance and the second feature distance between the two target objects; and determine the association relationships between the target objects in the first image and the target objects in the second image based on the determined feature distances.

In some possible implementations, the detecting module is further configured to: perform weighted summation on the first feature distance and the second feature distance between the two target objects to obtain the feature distance between the two target objects, where the higher the similarity between the two target objects, the greater a weight coefficient of the second feature distance between the two target objects during weighted summation.

In some possible implementations, the detecting module is further configured to: determine geometric distances between the target objects in the first image and the target objects in the second image; for a target object in the first image and a target object in the second image, determine a distance between the two target objects according to the feature distance and the geometric distance between the two target objects; and determine the association relationships between the target objects in the first image and the target objects in the second image according to the distances between the target objects in the first image and the target objects in the second image.

In some possible implementations, the detecting module is further configured to: form a distance matrix according to the distances between the target objects in the first image and the target objects in the second image, where the value of an element in the distance matrix represents the distance between a target object in the first image and a target object in the second image; and determine an adjacency matrix between the first image and the second image according to the distance matrix, where the value of an element in the adjacency matrix represents whether a target object in the first image is associated or not associated with a target object in the second image.

In some possible embodiments, the game stage determining module is further configured to: determine, in response to a specific target object being detected in a specific region of the game tabletop in at least one image frame in the video streams, a time point corresponding to a first image frame in a plurality of continuous image frames in which the specific target object is detected in the specific region of the game tabletop; and take the determined time point as a start time point of a game stage.

The video streams include video streams synchronously acquired in a plurality of views of the game tabletop, and in some possible implementations, the game stage determining module is further configured to: determine the first image frame in the plurality of continuous image frames in which the specific target object is detected in the specific region of the game tabletop in a video stream in one view; determine a synchronous image acquired synchronously with the first image frame from a video stream synchronously acquired in another view; and determine, in response to the specific target object being detected in the specific region of the game tabletop in at least one of N image frames before the synchronous image, a time point corresponding to an image in which the specific target object is detected in the specific region of the game tabletop earliest among the N image frames before the synchronous image.

In some possible implementations, the game stage determining module is further configured to: determine, in response to no specific target object being detected in the specific region of the game tabletop in the N image frames before the synchronous image, the time point corresponding to the first image frame.

In some possible implementations, the game stage determining module is further configured to: determine, in response to the specific target object being detected in the specific region of the game tabletop in the at least one image frame in the video streams, the time point corresponding to the first image frame in the plurality of continuous image frames in which the specific target object is detected in the specific region of the game tabletop, including:

determining, in response to a game currency being detected in a game participation region of the game tabletop in the at least one image frame in the video streams, a time point corresponding to a first image frame in a plurality of continuous image frames in which a game currency is detected in a game participation region of the game tabletop; and take the determined time point as the start time point of the game stage, including:

taking the determined time point as a start time point of a first game stage.

In some possible implementations, the game stage determining module is further configured to: determine, in response to the specific target object being detected in the specific region of the game tabletop in the at least one image frame in the video streams, the time point corresponding to the first image frame in the plurality of continuous image frames in which the specific target object is detected in the specific region of the game tabletop, including:

determining, in response to a game card being detected in a game play region of the game tabletop in the at least one image frame in the video streams, a time point corresponding to a first image frame in a plurality of continuous image frames in which a game card is detected in the game play region of the game tabletop; and take the determined time point as the start time point of the game stage, including:

taking the determined time point as an end time point of a first game stage and a start time point of a second game stage.

In some possible implementations, the game stage determining module is further configured to: determine, in response to the specific target object being detected in the specific region of the game tabletop in the at least one image frame in the video streams, the time point corresponding to the first image frame in the plurality of continuous image frames in which the specific target object is detected in the specific region of the game tabletop, including:

determining, in response to the number of game cards or the sum of points thereof in the game play region of the game tabletop being detected to reach a preset condition in the at least one image frame in the video streams, a time point corresponding to a first image frame in a plurality of continuous image frames in which the number of game cards or the sum of points thereof in the game play region of the game tabletop is detected to reach the preset condition; and take the determined time point as the start time point of the game stage, including:

taking the determined time point as an end time point of a second game stage and a start time point of a third game stage.

In some possible implementations, the current game stage is a betting stage, the target objects include a person object and an item object, and the result determining module is further configured to: determine correspondence relationships between game currencies and players; and determine game participation results of the players according to the determined correspondence relationships and rules at the first game stage, where the game participation result includes the total value of game currencies of the player involved in a game and a sub-region where the game currencies involved in the game are located in a game participation region.

In some possible implementations, the current game stage is a card give-out stage, and the result determining module is further configured to: issue prompt information if any of the following occurs:

if it is detected that a game participation result in a game participation region of the game tabletop changes; and if it is detected that the type, position, or appearance order of a game card in a game play region of the game tabletop is different from a preset rule.

The result determining module is further configured to: determine game results according to positions and points of game cards in a game play region of the game tabletop at an end time point of a second game stage.

The current game stage is a third game stage, and the result determining module is further configured to: determine payment results of players according to game results determined at the end of a second game stage, game participation results of the players at the end of a first game stage, and payment rules.

The result determining module is further configured to: determine payment results performed by an operator; compare the payment results of the players with the payment results performed by the operator to determine whether the payment results are performed correctly; and issue alarm information if the payment results are performed incorrectly.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium or a volatile computer-readable storage medium.

The embodiments of the present disclosure further provide an electronic device, including: a processor; and a memory configured to store processor-executable instructions, where the processor is configured to execute the foregoing method.

The embodiments of the present disclosure further provide a computer program comprising computer-readable codes which, when run in the electronic device, cause the processor in the electronic device to execute the foregoing method.

The electronic device may be provided as a terminal, a server, or a device in another form.

Without violating logic, different embodiments of the present disclosure may be combined with each other. The description of different embodiments focuses on different aspects, and for the aspect which has not been described in one embodiment, the corresponding description in another embodiment can be referred to.

In some embodiments, the functions provided by or the modules included in the apparatus provided by the embodiments of the present disclosure may be used for implementing the method described in the foregoing method embodiments. For specific implementations, reference may be made to the description in the method embodiments above. For the purpose of brevity, details are not described herein again.

Figure 11:
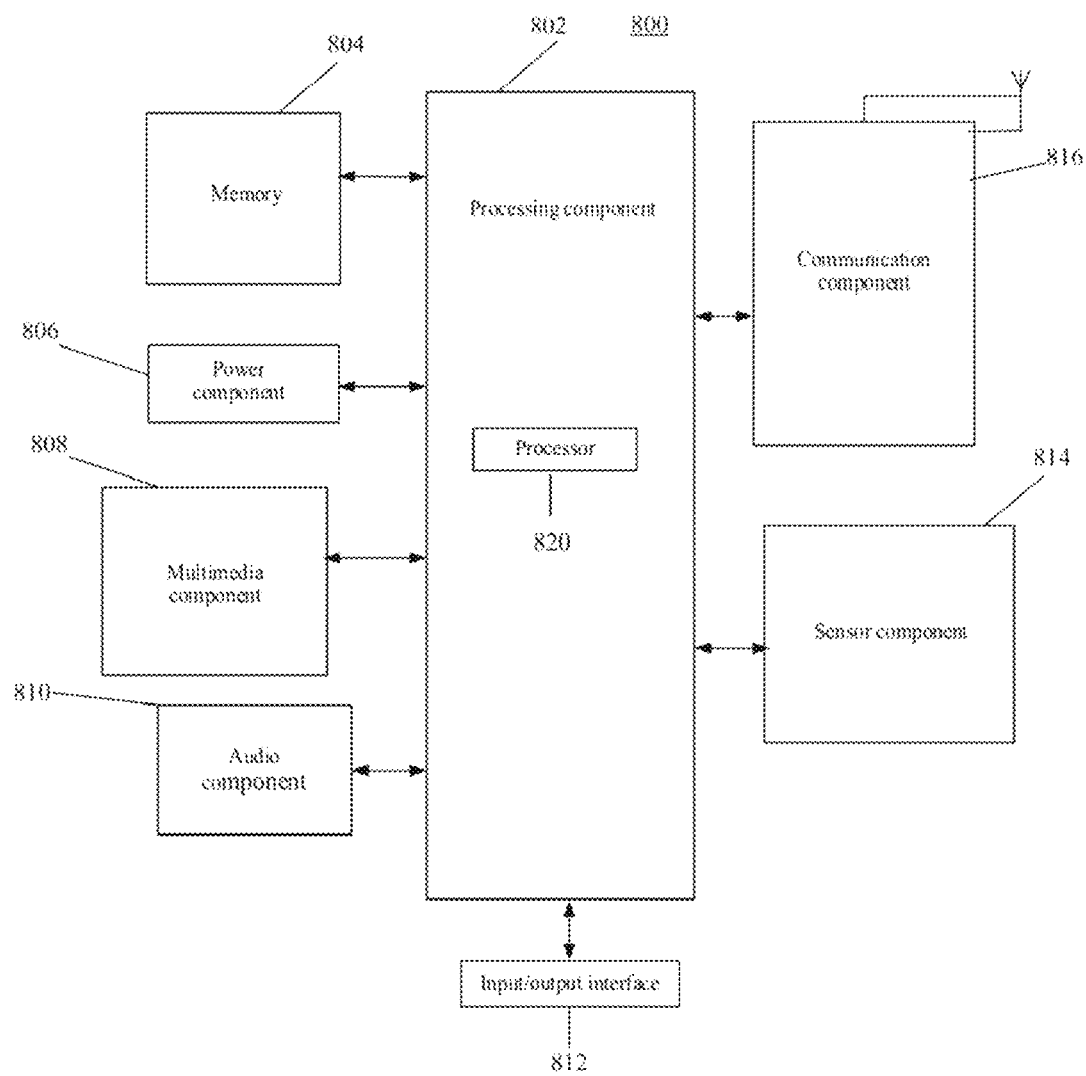
FIG. 11 is a block diagram of an electronic device according to embodiments of the present disclosure.

FIG. 11 is a block diagram of an electronic device according to embodiments of the present disclosure. For example, an electronic device 800 may be a terminal such as a mobile phone, a computer, a digital broadcast terminal, a message transceiver device, a game console, a tablet device, a medical device, exercise equipment, and a personal digital assistant.

Referring to FIG. 11, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application program or method operated on the electronic device 800, contact data, contact list data, messages, pictures, videos, etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby item when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to implement the method above.

In an exemplary embodiment, further provided is a non-volatile computer-readable storage medium or a volatile computer-readable storage medium, for example, a memory 804 including computer program instructions, which can be executed by the processor 820 of the electronic device 800 to implement the method above.

Figure 12:
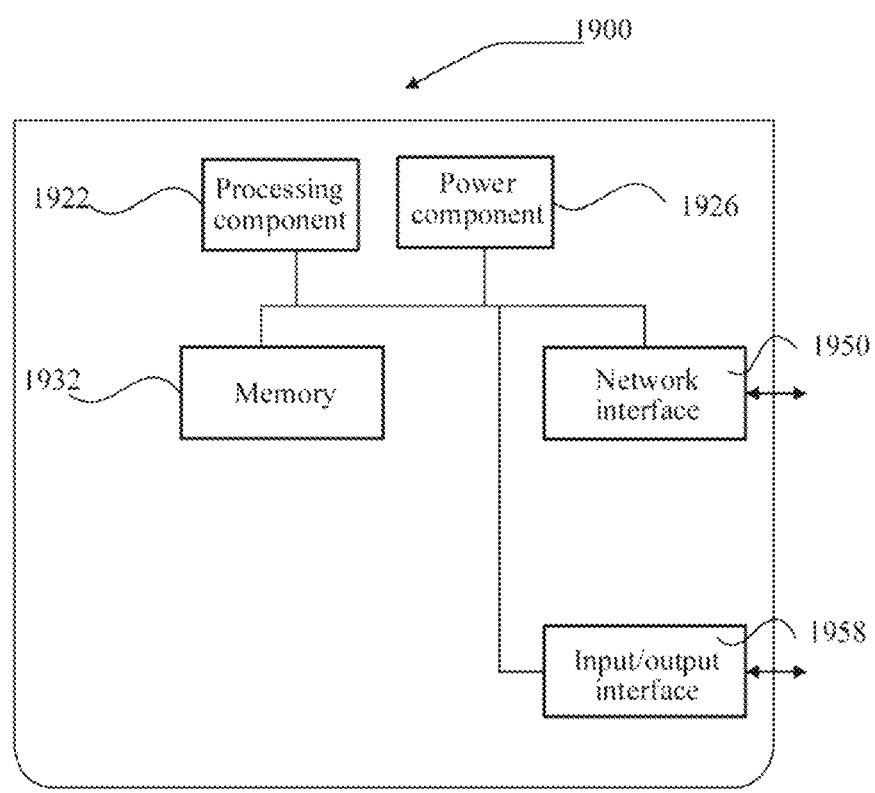
FIG. 12 is a block diagram of another electronic device according to embodiments of the present disclosure.

FIG. 12 shows a block diagram of another electronic device 1900 according to embodiments of the present disclosure. For example, the electronic device 1900 may be provided as a server. Referring to FIG. 12, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to implement the method above.

The electronic device 1900 may further include a power component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as the server operating system released by Microsoft (Windows Server™), the operating system based on Graphic User Interface released by Apple (Mac OS X™), the multi-user and multi-tasking computer operating system (Unix™), the free and open-source Unix-like operating system (Linux™, FreeBSD™) or the like.

In an exemplary embodiment, further provided is a non-volatile computer-readable storage medium or a volatile computer-readable storage medium, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer diskette, a hard disk, a Random Access Memory (RAM), an ROM, an EPROM (or a flash memory), an SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium used herein is not to be construed as being a transitory signal per se, such as a radio wave or other freely propagating electromagnetic waves, an electromagnetic wave propagating through a waveguide or other transmission media (e.g., a light pulse passing through a fiber-optic cable), or an electrical signal transmitted through a wire.

The computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may include a copper transmission cable, an optical transmission fiber, wireless transmission, a router, a firewall, a switch, a gateway computer and/or an edge server. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may be executed entirely on the user's computer, partly on the user's computer, as a stand-alone software package, partly on the user's computer and partly on a remote computer or entirely on the remote computer or server. In a scenario involving a remote computer, the remote computer may be connected to the user's computer via any type of network, including a LAN or a WAN, or the connection may be made to an external computer (for example, via the Internet using an Internet service provider). In some embodiments, electronic circuitry including, for example, programmable logic circuitry, a Field-Programmable Gate Array (FPGA), or a Programmable Logic Array (PLA) may execute the computer-readable program instructions by utilizing state information of the computer-readable program instructions to personalize the electronic circuitry, so as to implement the aspects of the present disclosure.

The aspects of the present disclosure are described herein with reference to flowcharts and/or block diagrams of the method, apparatus (system), and computer program product according to the embodiments of the present disclosure. It should be understood that each block of the flowcharts and/or block diagrams, and combinations of the blocks in the flowcharts and/or block diagrams can be implemented by computer-readable program instructions.

The computer-readable program instructions may be provided to a processor of a general-purpose computer, a special-purpose computer, or other programmable data processing apparatuses to produce a machine, such that when the instructions are executed by the processor of the computer or other programmable data processing apparatuses, an apparatus for implementing the functions/acts specified in one or more blocks of the flowcharts and/or block diagrams is created. The computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatuses, or other devices to cause a series of operational steps to be executed on the computer, other programmable apparatuses or other devices to produce a computer implemented process, such that the instructions executed on the computer, other programmable apparatuses or other devices implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowcharts or block diagrams may represent a module, a program segment, or a portion of instruction, which includes one or more executable instructions for implementing a specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It also be noted that each block of the block diagrams and/or flowcharts, and combinations of blocks in the block diagrams and/or flowcharts, can be implemented by a special purpose hardware-based system that performs the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. An image processing method, comprising:
   obtaining, by one or more processors, video streams of a game tabletop;
   detecting, by one or more processors, target objects in a plurality of image frames comprised in the video streams;

determining, by one or more processors, a current game stage based on the target objects;

determining, by one or more processors, game detecting results according to the target objects and the determined game stage;

wherein the video streams comprise video streams synchronously acquired in a plurality of views of the game tabletop, and wherein the detecting the target objects in the plurality of image frames comprised in the video streams further comprises:

performing target detection on a first image acquired in a first view to determine target objects in the first image;

performing target detection on a second image synchronously acquired in a second view to determine target objects in the second image; and determining association relationships between the target objects in the first image and the target objects in the second image based on appearance information and surrounding information of the target objects in the first image and appearance information and surrounding information of the target objects in the second image.

2. The image processing method according to claim 1, wherein the appearance information of a target object is determined according to pixels within a bounding box of the target object in an image in which the target object is located, and the surrounding information of a target object is determined according to pixels within a set range around a bounding box of the target object in an image in which the target object is located.

3. The image processing method according to claim 2, wherein determining the association relationships between the target objects in the first image and the target objects in the second image based on the appearance information and the surrounding information of the target objects in the first image and the appearance information and the surrounding information of the target objects in the second image comprises:

determining first feature distances based on the appearance information of the target objects in the first image and the appearance information of the target objects in the second image, wherein a first feature distance represents a similarity between a target object in the first image and a target object in the second image;

determining second feature distances based on the surrounding information of the target objects in the first image and the surrounding information of the target objects in the second image, wherein a second feature distance represents a similarity between the surrounding information of a target object in the first image and the surrounding information of a target object in the second image;

for a target object in the first image and a target object in the second image, determining a feature distance between the two target objects according to the first feature distance and the second feature distance between the two target objects; and determining the association relationships between the target objects in the first image and the target objects in the second image based on the determined feature distances.

4. The image processing method according to claim 3, wherein determining the feature distance between the two target objects according to the first feature distance and the second feature distance between the two target objects comprises:

performing weighted summation on the first feature distance and the second feature distance between the two target objects to obtain the feature distance between the two target objects, wherein the higher the similarity between the two target objects, the greater a weight coefficient of the second feature distance between the two target objects during weighted summation.

5. The image processing method according to claim 3, wherein the method further comprises:

determining geometric distances between the target objects in the first image and the target objects in the second image; and determining the association relationships between the target objects in the first image and the target objects in the second image based on the determined feature distances comprises:

for a target object in the first image and a target object in the second image, determining a distance between the two target objects according to the feature distance and the geometric distance between the two target objects; and determining the association relationships between the target objects in the first image and the target objects in the second image according to the distances between the target objects in the first image and the target objects in the second image.

6. The image processing method according to claim 5, wherein determining the association relationships between the target objects in the first image and the target objects in the second image according to the distances between the target objects in the first image and the target objects in the second image comprises:

forming a distance matrix according to the distances between the target objects in the first image and the target objects in the second image, wherein the value of an element in the distance matrix represents the distance between a target object in the first image and a target object in the second image; and determining an adjacency matrix between the first image and the second image according to the distance matrix, wherein the value of an element in the adjacency matrix represents whether a target object in the first image is associated or not associated with a target object in the second image.

7. The image processing method according to claim 1, wherein determining the current game stage based on the target objects comprises:

determining, in response to a specific target object being detected in a specific region of the game tabletop in at least one image frame in the video streams, a time point corresponding to a first image frame in a plurality of continuous image frames in which the specific target object is detected in the specific region of the game tabletop; and taking the determined time point as a start time point of a game stage.

8. The image processing method according to claim 7, wherein the video streams comprise video streams synchronously acquired in a plurality of views of the game tabletop, and determining the time point corresponding to the first image frame in the plurality of continuous image frames in which the specific target object is detected in the specific region of the game tabletop comprises:

determining the first image frame in the plurality of continuous image frames in which the specific target object is detected in the specific region of the game tabletop in a video stream in one view;

determining a synchronous image acquired synchronously with the first image frame from a video stream synchronously acquired in another view; and determining, in response to the specific target object being detected in the specific region of the game tabletop in at least one of N image frames before the synchronous image, a time point corresponding to an image in which the specific target object is detected in the specific region of the game tabletop earliest among the N image frames before the synchronous image.

9. The image processing method according to claim 8, further comprising:

determining, in response to no specific target object being detected in the specific region of the game tabletop in the N image frames before the synchronous image, the time point corresponding to the first image frame.

10. The image processing method according to claim 7, wherein determining, in response to the specific target object being detected in the specific region of the game tabletop in the at least one image frame in the video streams, the time point corresponding to the first image frame in the plurality of continuous image frames in which the specific target object is detected in the specific region of the game tabletop comprises:

determining, in response to a game currency being detected in a game participation region of the game tabletop in the at least one image frame in the video streams, a time point corresponding to a first image frame in a plurality of continuous image frames in which a game currency is detected in a game participation region of the game tabletop; and taking the determined time point as the start time point of the game stage comprises:

taking the determined time point as a start time point of a first game stage.

11. The image processing method according to claim 7, wherein determining, in response to the specific target object being detected in the specific region of the game tabletop in the at least one image frame in the video streams, the time point corresponding to the first image frame in the plurality of continuous image frames in which the specific target object is detected in the specific region of the game tabletop comprises:

determining, in response to a game card being detected in a game play region of the game tabletop in the at least one image frame in the video streams, a time point corresponding to a first image frame in a plurality of continuous image frames in which a game card is detected in the game play region of the game tabletop; and taking the determined time point as the start time point of the game stage comprises:

taking the determined time point as an end time point of a first game stage and a start time point of a second game stage.

12. The image processing method according to claim 7, wherein determining, in response to the specific target object being detected in the specific region of the game tabletop in the at least one image frame in the video streams, the time point corresponding to the first image frame in the plurality of continuous image frames in which the specific target object is detected in the specific region of the game tabletop comprises:

determining, in response to the number of game cards or the sum of points thereof in the game play region of the game tabletop being detected to reach a preset condition in the at least one image frame in the video streams, a time point corresponding to a first image frame in a plurality of continuous image frames in which the number of game cards or the sum of points thereof in the game play region of the game tabletop is detected to reach the preset condition; and taking the determined time point as the start time point of the game stage comprises:

taking the determined time point as an end time point of a second game stage and a start time point of a third game stage.

13. The image processing method according to claim 1, wherein the current game stage is a first game stage, the target objects comprise a person object and an item object, and determining the game detecting results according to the target objects and the determined current game stage comprises:

determining correspondence relationships between game currencies and players; and determining game participation results of the players according to the determined correspondence relationships and rules at the first game stage, wherein the game participation result comprises the total value of game currencies of the player involved in a game and a sub-region where the game currencies involved in the game are located in a game participation region.

14. The image processing method according to claim 1, wherein the current game stage is a second game stage, and determining the game detecting results according to the target objects and the determined game stage comprises:

issuing prompt information if any of the following occurs:

if it is detected that a game participation result in a game participation region of the game tabletop changes; and if it is detected that the type, position, or appearance order of a game card in a game play region of the game tabletop is different from a preset rule.

15. The image processing method according to claim 1, wherein determining the game detecting results according to the target objects and the determined game stage comprises:

determining game results according to positions and points of game cards in a game play region of the game tabletop at an end time point of a second game stage.

16. The image processing method according to claim 1, wherein the current game stage is a third game stage, and determining the game detecting results according to the target objects and the determined game stage comprises:

determining payment results of players according to game results determined at the end of a second game stage, game participation results of the players at the end of a first game stage, and payment rules.

17. The image processing method according to claim 16, further comprising:

determining payment results performed by an operator;

comparing the payment results of the players with the payment results performed by the operator to determine whether the payment results are performed correctly; and issuing alarm information if the payment results are performed incorrectly.

18. An image processing apparatus, comprising:

a processor; and a memory configured to store processor-executable instructions;

wherein the processor is configured to invoke the instructions stored in the memory to:

obtain video streams of a game tabletop;

detect target objects in a plurality of image frames comprised in the video streams;

determine a current game stage based on the target objects;
determine game detecting results according to the target objects and the determined game stage;
wherein the video streams comprise video streams synchronously acquired in a plurality of views of the game tabletop, and wherein detecting the target objects in the plurality of image frames comprised in the video streams further comprises:
performing target detection on a first image acquired in a first view to determine target objects in the first image;
performing target detection on a second image synchronously acquired in a second view to determine target objects in the second image; and
determining association relationships between the target objects in the first image and the target objects in the second image based on appearance information and surrounding information of the target objects in the first image and appearance information and surrounding information of the target objects in the second image.

19. A non-transitory computer-readable storage medium, having computer program instructions stored thereon, wherein when the computer program instructions are executed by a processor, computer program instructions cause the processor to:

obtain video streams of a game tabletop;
detect target objects in a plurality of image frames comprised in the video streams;
determine a current game stage based on the target objects;
determine game detecting results according to the target objects and the determined game stage;
wherein the video streams comprise video streams synchronously acquired in a plurality of views of the game tabletop, and wherein detecting the target objects in the plurality of image frames comprised in the video streams further comprises:
performing target detection on a first image acquired in a first view to determine target objects in the first image;
performing target detection on a second image synchronously acquired in a second view to determine target objects in the second image; and
determining association relationships between the target objects in the first image and the target objects in the second image based on appearance information and surrounding information of the target objects in the first image and appearance information and surrounding information of the target objects in the second image.

* * * * *